Oct. 6, 1959
W. MOORE, JR
2,907,931
CONTROL APPARATUS
Filed July 9, 1954
4 Sheets-Sheet 1
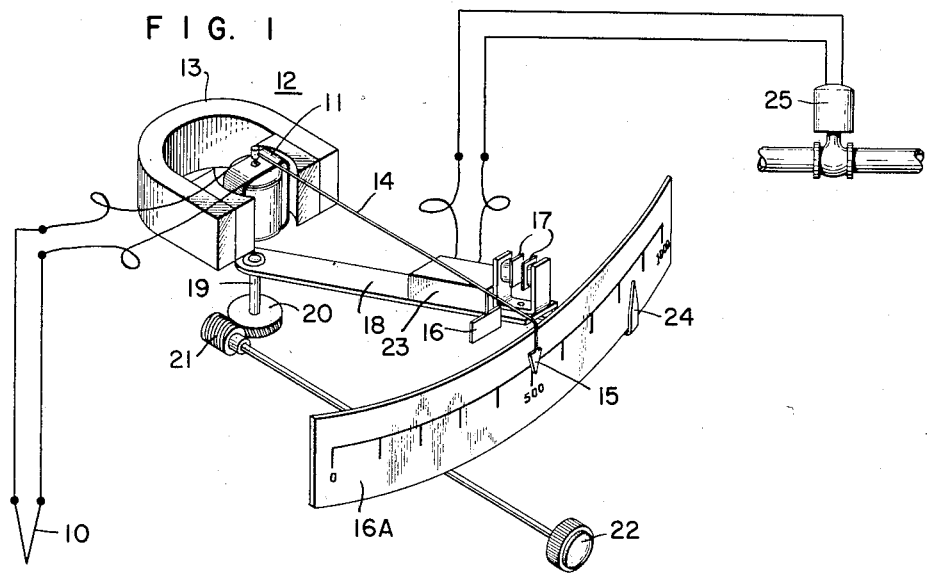
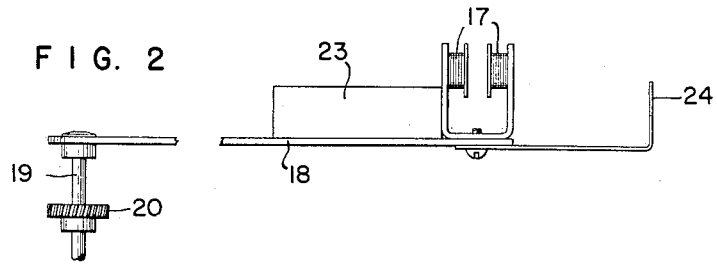
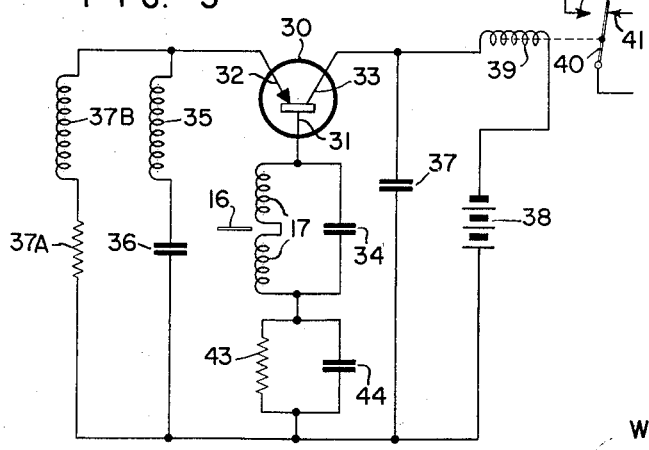
*INVENTOR.*
WARREN MOORE JR.
BY
*Arthur H. Swanson*
ATTORNEY.

Oct. 6, 1959 W. MOORE, JR 2,907,931
CONTROL APPARATUS
Filed July 9, 1954 4 Sheets-Sheet 2

*INVENTOR.*
WARREN MOORE JR
BY
*Arthur H. Swanson*
ATTORNEY.

Oct. 6, 1959     W. MOORE, JR     2,907,931
CONTROL APPARATUS

Filed July 9, 1954     4 Sheets-Sheet 4

*INVENTOR.*
WARREN MOORE JR.

BY

ATTORNEY.

United States Patent Office 2,907,931
Patented Oct. 6, 1959

2,907,931

CONTROL APPARATUS

Warren Moore, Jr., North Hills, Pa., assignor to Minneapolis-Honeywell Regulator Company, Minneapolis, Minn., a corporation of Delaware Application July 9, 1954, Serial No. 442,230

2 Claims. (Cl. 317—148.5)

A general object of the present invention is to provide a new and improved vane controller using an electrical oscillator circuit as a movable vane position sensing means. More specifically, the present invention is concerned with a new and improved highly sensitive vane controller of the transistor type which is characterized by its safe operation, its accuracy, and its adaptability to simplifying structurally an electrical vane type controller.

Vane controllers are frequently used for sensing and regulating the magnitude of some controlled variable. Generally, these vane controllers take the form of a galvanometer which has a direct current input signal fed thereto to cause deflection of the galvanometer in accordance with the magnitude of the input signal. Attached to the galvanometer is a suitable arm which has a pointer at the outer end thereof cooperating with a scale to provide a visual indication of the magnitude of the variable being observed. The arm additionally carries a vane which vane may be used to change the tuning of an oscillator circuit with the oscillator circuit going into or out of oscillation in accordance with the position of the vane relative to an impedance element in the oscillator circuit. The change in current flow in the oscillator circuit may be used to actuate a control relay which in turn may regulate the magnitude of the variable which is under observation.

The addition of transistors to electrical control circuitry, particularly the present type, presents many practical difficulties. The principal difficulty with transistors lies in the instabilities and drifts which occur in the devices as they age and as they are subjected to variations in ambient temperatures normally encountered. These instabilities and drifts render conventional circuits of no utility in meeting the rigid requirements of an accurate and highly sensitive vane controller. It is desirable that the apparatus be of the type which will fail safe in the event that there is a failure in the oscillator circuit or in the power supply therefor. In other words, if there is a failure of the circuitry, the output control relay should move to a position where it will not cause a change in a controlled variable which will be in an unsafe direction.

It is accordingly a more specific object of the present invention to provide a new and improved vane type controller using transistors as the gain producing elements of an oscillator and amplifier circuit.

Another more specific object of the present invention is to provide a vane controller using the negative impedance characteristics of a transistor in an oscillator circuit.

A further more specific object of the present invention is to provide a new and improved oscillator circuit which is periodically energized and having control means adapted to be energized or deenergized in accordance with the presence or absence of oscillations during the period of periodic energization.

A still further more specific object of the present invention is to provide a new and improved vane control apparatus using an oscillator to control the shunting action of a control relay shunting means in accordance with the position of a movable vane with respect to an impedance element of the oscillator circuit.

The need for closely physically associating the vane controlled impedance and the other oscillator circuit components have presented practical structural design difficulties in the prior art vane controllers. Unless the variable impedance element is positioned directly adjacent the oscillator circuits, stray electrical fields and electrical reactive effects tend adversely to affect the operation of the oscillator and to limit the usefulness of the entire instrument. It is therefore desirable to place the variable reactance elements closely adjacent the oscillator.

In controllers of this type, the set point of the controller ordinarily is adjusted by moving the position of the impedance element relative to the indicator scale of the galvanometer. As this variable impedance element must be movable, it has been the practice to provide flexible connecting leads between the said element and the oscillator circuit components. The need for such flexible connections has been obviated in accordance with the present invention by mounting the variable impedance element and oscillator circuit components on a unitary structure carried by the set point adjusting arm and arranged in the path of the galvanometer carried vane. With this arrangement, not only is miniaturization and structural simplification accomplished, but also a marked improvement in performance. This for the reason that there has been eliminated the tendency to undesirable effects to which the prior art apparatus is subjected and which results from the relatively long leads connecting the variable impedance element to the oscillator circuit.

It is, therefore, a further specific object of the present invention to provide a vane controller having a member, movable relative to an indicator scale in accordance with the magnitude of a variable, carrying a vane, and a second set point member movable relative to the indicator scale where the second member carries an oscillator vane detection circuit in the form of variable impedance and oscillator circuit components mounted directly adjacent thereto.

The various features of novelty which characterize the invention are pointed out with particularity in the claims annexed to and forming a part of this specification. For a better understanding of the invention, its advantages, and specific objects attained with its use, reference should be had to the accompanying drawings and descriptive matter in which there is illustrated and described preferred embodiments of the invention.

Of the drawings:

Fig. 1 is a perspective view of the principal components of a galvanometer vane controller incorporating the principles of the present invention;

Fig. 2 shows a side view of the set point arm of Fig. 1;

Fig. 3 shows the basic vane controlled oscillator circuit used in the present invention;

Fig. 6 shows a modified form of apparatus incorporating fail safe features of the type shown in Fig. 5;

Figure 4:
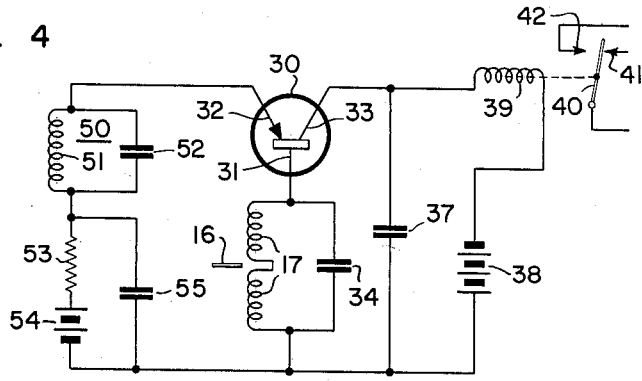
Fig. 4 shows a modified form of oscillator incorporating the same basic operating principles.

Referring first to Fig. 1, the numeral 10 represents a thermocouple which may be sensing the magnitude of some variable, such as temperature. The output of the thermocouple is a unidirectional signal which is applied to a coil 11 of a permanent magnet galvanometer assembly 12. The coil 11 is mounted in a magnetic field defined by the poles of a permanent magnet 13. Carried by the coil 11 is an arm 14 with an indicator pointer 15 attached to the outer end thereof. Indicator 15 cooperates with a suitable calibrated scale 16A. Also carried by the arm 14 is a movable vane 16, the latter of which is adapted to move between a variable impedance element 17, the latter taking the form in the present application of a pair of coils. The impedance element 17 is mounted on a movable member 18 which is pivoted about a shaft 19. The shaft 19 is preferably in axial alignment with the pivot axis of the galvanometer coil 11. The lower end of the shaft 19 carries a spur gear 20 which cooperates with a worm gear 21. The worm gear 21 may be rotated by manually adjusting the adjustable knob 22 which is positioned under the scale 16A. Also carried by the member 18 are the oscillator and amplifier components mounted within a housing 23. At the outer end of the member 18 is a set point indicator pointer 24.

The output circuit of the oscillator apparatus may be used to control the operation of a valve or other suitable control mechanism 25 to regulate the magnitude of the variable affecting the output signal from the thermocouple 10.

In considering the operation of the apparatus of Fig. 1, it should first be noted that a unidirectional signal from the thermocouple 10 will produce a current flow through the coil 11 and cause the coil to be deflected by an amount proportional to the magnitude of the input signal. As the coil 11 is deflected, the arm 14 will be carried thereby and will move the pointer 15 over the scale 16A. If the input signal is of sufficient magnitude, the arm 14 will move the vane 16 until such time as it moves between the two coils 17 which form the variable impedance element for the oscillator circuits within the housing 23. If the vane 16 is between the coils 17, the resultant change in impedance will be reflected into the oscillator circuits and there will be a change in the current flow therein which may be used to control the valve 25. If it is desired to change the set point of the apparatus, it is necessary to change the position of the coils 17 relative to the arm 14 which carries the vane 16. This is accomplished by moving the manually adjustable knob 22 which rotates the spur gear 20, shaft 19, and the member 18 which carries the coil 17. The vane 16 will be effective to vary the impedance of the coils 17 only when the vane has been positioned to a point by the arm 14 to correspond to the position of the coils 17. The set point adjustment will be observed on the indicator scale 16 by the observance of the position of the pointer 24.

As viewed in Fig. 2, it will be readily apparent that the amplifier and oscillator circuits of the apparatus are positioned directly adjacent the coils 17 which means that problems due to coupling leads between the coils 17 and the oscillator circuits are eliminated. This advantage can be conveniently attained in the present type of apparatus by the incorporation of the special circuitry which has been devised and forms a part of the invention to be discussed below. It will further be readily apparent that the apparatus is such as to permit space saving structure simplification of a completed instrument.

*Figure 3*

The circuit of Fig. 3 shows a preferred form of oscillator for use in the present apparatus since this oscillator will give on-off type of control action with movement of the vane by the primary control. In this form of the apparatus there is provided a transistor 30 having a base electrode 31, an emitter electrode 32, and a collector electrode 33. Coupled to the base electrode 31 is a resonant tank circuit comprising the coils 17 adapted to be variably tuned by the vane 16 and a condenser 34. Connected in the emitter electrode circuit is a series connected inductance 35 and condenser 36. In parallel with this last named series connection is a further coil 37B and a resistor 37A. Connected across the output of the circuit is an R.F. bypass condenser 37. Supplying power to the transistor collector electrode and base electrode circuit is a suitable source 38, shown here as a battery. In series with the battery 38 is a relay coil 39 which is adapted to actuate a switch blade 40 and move the blade from engagement with a contact 41 into engagement with an associated contact 42 when the relay coil has sufficient current flowing therethrough. If the internal base resistance of transistor 30 is low, it may be desirable to provide a base resistor 43 having a condenser 44 in parallel therewith.

In considering the operation of this circuit, it should first be noted that the transistor 30 is preferably of the point contact type which has a region of operation in which it exhibits negative impedance characteristics. When a resonant circuit is connected to a negative impedance, it is possible to form an oscillator circuit with the tank circuit being supplied with power by the negative impedance circuit. The oscillator in Fig. 3 relies for its operation upon the negative impedance presented by the emitter-base circuit which is connected across the parallel resonant circuit formed by the coils 17 and condenser 34. A more complete analysis of an oscillator of this basic type may be found on pages 275–278, "Principles of Transistor Circuits," edited by R. F. Shea, John Wiley & Sons, 1953. At the selected resonant frequency, the coil 35 and condenser 36 present a low positive impedance which is small compared to the negative impedance of the circuit and consequently, the circuit will remain in oscillation.

To insure that the oscillator circuit is in the proper region of operation, insofar as the negative impedance characteristic of transistor 30 is concerned, it is necessary to select the bias by proper size selection of the resistors for the emitter resistor 37A and base resistor 43 and this will vary depending upon the type of transistor used.

As long as the impedance between the emitter electrode 32 and the lower end of the coils 17 remains low, the circuit will continue to oscillate with relatively high amplitude oscillations and as a result there will be a higher average direct current flowing in the collector electrode circuit. This will mean that the relay coil 39 will be maintaining the blade 40 in engagement with contact 42.

As long as the vane 16 remains outside of the coils 17, the oscillator will continue to oscillate. As soon as the vane 16 is moved between the coils 17, the inductance thereof will greatly decrease with a resultant increase in the resonant frequency in the tank circuit formed by the coils 17 and condenser 34. With the tank circuit tuned to a higher frequency, the oscillator will no longer oscillate because the impedance of the series resonant circuit formed by the coil 35 and condenser 36 will now appear as a high positive impedance which is greater than the negative impedance of the circuit. Since the negative impedance is no longer predominant, there is no apparent source of power to sustain oscillations in the resonant tank circuit. Under these circumstances, the current flow through the collector electrode circuit and the relay coil 39 will be lowered and insufficient to maintain the switch blade 40 in engagement with the contact 42 so that blade 40 will move out of engagement with the contact 42 and into engagement with the contact 41. When the vane moves out of the coils 17, the circuit will go back into oscillation and the average direct current flowing in the collector circuit will be sufficient to reenergize the relay coil 39 so that blade 40 will now engage contact 42.

By making the series resonant circuit formed of coil 35 and condenser 36 of a highly selective nature, it is possible to cause the oscillator to go into and out of oscillation with a very slight change in the resonant frequency of the base electrode tank circuit. This highly selective nature may be achieved by selecting coil 35 and condenser 36 to have high reactive impedances. At the resonant frequency, the reactances will cancel but when the frequency is slightly off resonance, the series impedance becomes high. It will be noted that with this form of oscillator circuit that if the oscillations fail, the relay will be deenergized. Thus, if there should be any open circuit in the transistor, the oscillator current flow will be insufficient to pull in the control relay. Likewise, any opening of the power supply for the circuit or the short circuiting of the same will result in a similar loss of energizing current for the relay and the relay will remain deenergized.

Figure 4

In the circuit of Fig. 4, the basic oscillator circuit is substantially the same except for the emitter electrode circuit. Similar components between Figs. 3 and 4 carry corresponding reference characters. The emitter electrode circuit includes a parallel tank circuit 50 formed of a coil 51 connected in parallel with a condenser 52. In series with this tank circuit is a resistor 53 and a battery 54. A bypass condenser 55 is connected in parallel with the resistor 53 and battery 54.

The operating principles of the circuit of Fig. 4 are basically the same as those of Fig. 3 with the exception that in this figure the resonant tank circuit 50 is selected to have a resonant frequency considerably higher than the resonant frequency of the base electrode tank circuit. Since the tank circuit 50 is a parallel circuit, the impedance thereacross will be relatively low when the frequency applied thereto is not at the resonant frequency of the tank circuit. In other words, if the circuit of Fig. 4 is in oscillation at a frequency determined by the frequency of the base electrode tank circuit, the circuit will stay in oscillation because the tank circuit 50 will present only a low impedance compared to the negative impedance of the circuit connected to the coils 17 and condenser 34.

If the vane 16 is moved into the coils 17, the resonant frequency of the base electrode tank circuit will increase and when its resonant frequency approaches the resonant frequency of the tank circuit 50, the tank circuit 50 will present a high positive impedance in the emitter electrode circuit and this high positive impedance will eliminate the effect of the negative impedance on the base tank circuit. This will cause the oscillator circuit to stop oscillating so that the relay coil 49 will no longer have sufficient current flowing therethrough to maintain the same in an energized state.

When the vane 16 is out from between the coils 17, the resonant frequency of the base electrode tank circuit will be changed back to its original value and the circuit will go back into oscillation with the tank circuit 50 again presenting a low impedance in the emitter electrode circuit.

Figure 5

Figure 5:
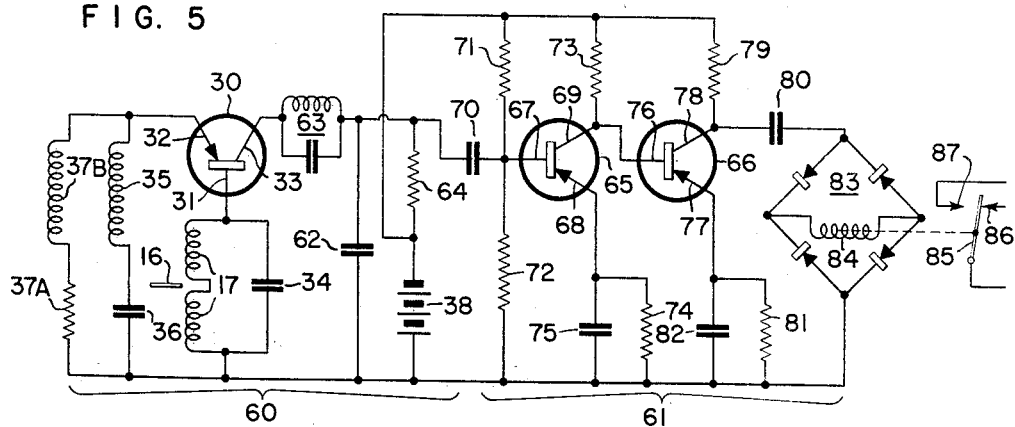
Fig. 5 shows a form of the oscillator apparatus incorporating special fail safe features.

The circuit of Fig. 5 is comprised of an oscillator section 60 and an amplifier section 61. The oscillator section 60 is substantially identical to the oscillator shown in Fig. 3 and corresponding components carry corresponding reference characters. The only addition to Fig. 5 in the oscillator section is a condenser 62 having a capacitance larger than that of condenser 37, and parallel resonant tank circuit 63 which is connected in the collector electrode circuit of transistor 30 and a resistor 64 which is connected in series with the battery 38.

The amplifier section comprises a pair of transistor devices 65 and 66, both of which are connected as common emitter amplifiers. The transistor 65 comprises a base electrode 67, an emitter electrode 68, and a collector electrode 69. A coupling condenser 70 connects the electrical signal on the upper end of resistor 64 to the base electrode 67. A pair of biasing resistors 71 and 72 establish the bias potential for the base electrode 67. A collector electrode resistor 73 is connected to the collector electrode 69. Connected to the emitter electrode 68 is a resistor 74 having a condenser 75 connected in parallel therewith.

The transistor 66 comprises a base electrode 76, an emitter electrode 77, and a collector electrode 78. Connected to the collector electrode 78 is a resistor 79 and an output blocking condenser 80. Connected to the emitter electrode 77 is a resistor 81 and a parallel connected bypass condenser 82.

On the output of the amplifier 61 is a rectifier bridge 83 having the output of the amplifier connected across two of the bridge terminals and an output control relay 84 connected across the other two terminals of the bridge. The relay operates upon a blade 85, the latter of which is normally biased, by means not shown, into engagement with the contact 86 when the coil of the relay is deenergized and into engagement with the contact 87 when the relay coil is energized.

In considering the operation of Fig. 5, it should first be noted that the oscillator portion thereof operates in substantially the same way as the oscillator of Fig. 3. In other words, when the vane 16 is out of the coil 17, the oscillator will be in oscillation. When the vane is moved between the coils 17, the circuit is out of oscillation.

The network 63 in the collector electrode circuit is tuned to be resonant at a frequency higher than the normal oscillator frequency. Thus, when the base tank circuit is tuned to a higher frequency which approaches the high resonant frequency of the parallel network 63, the network presents a higher impedance which cuts down the overall circuit gain to less than one and thus causes the oscillator to stop oscillating. The presence of the network 63 with coil 35 and condenser 36 permits the attainment of a sharper cut off and on characteristic to the oscillator since they both act to control the circuit oscillations. It will be readily apparent that the network 63 may be added to the other forms of oscillator circuit disclosed.

In order to check the operation of the oscillator, the oscillator is rendered periodically operative by the circuit that includes the battery 38, resistor 64 and condenser 62. At the instant that the apparatus is brought into operation, the battery 38 will begin to charge the condenser 62 through the resistor 64. As the condenser charges, the oscillator will come into operation and will discharge the condenser. As this charge and discharge is accompanied by a time delay determined by the time constant of the condenser 62 and resistor 64, there will be produced a series of saw tooth waves across the condenser 62. As the condenser 62 will be discharged only when the oscillator is oscillating, it will be apparent that there will appear on the input of the amplifier portion 61 a saw tooth signal indicative of oscillation only when the oscillator section 60 is operative. If the vane 16 should be between the coils 17, the oscillator section will not be oscillating and there will be no saw tooth waves produced by the charge and discharge of condenser 62.

The saw tooth wave produced across the condenser 62 is applied to the input of the amplifier section 61. The signals amplified are of a lower frequency and for this reason the less expensive types of transistors may be used as the amplifying elements in the circuit. The input signal is passed through the coupling condenser 70 to the base electrode 67. The signal is amplified and appears on the collector electrode 65 and the base electrode 76 of the transistor 66. The output here is taken from the collector electrode 78 and is passed through the blocking condenser 80 to the rectifier bridge 83 which has the relay coil 84 in the output thereof. As long as the saw tooth pulses are being fed into the input of the amplifier section 61, there will be a rectified direct current signal passing through the relay coil 84 and the switch blade 85 will be moved into engagement with the contact 87. If the saw tooth wave should cease for any reason, the relay will become deenergized and the blade 85 will engage contact 86.

The particular advantage of the circuitry of Fig. 5 is that it is safe in its operation in that any failure of a component in the circuit will result in the relay in the output becoming deenergized. An additional advantage is obtained in that a larger amount of power is available for operating the relay and this power gain is obtained by an amplifier using transistors whose optimum amplification may be achieved with a lower frequency signal.

*Figure 6*

The circuit of Fig. 6 is similar in its operating principles to those of Fig. 5 in that its output control relay is rendered operative only in accordance with the presence of a modulated signal in the output of the oscillator. In this figure the oscillator section 90 is of the same type as the oscillator shown in Fig. 3 and corresponding components carry corresponding reference characters. The power supply for this particular oscillator is derived from a rectifier bridge 92 having connected to the input terminals thereof the transformer 93 energized by a conventional power supply, such as a 60 cycle power line. As the bridge 92 is a full wave rectifier bridge, there will appear on the output of the bridge a series of direct current pulses occurring at 120 cycles per second. These direct current pulses supply the energizing power for the oscillator section 90 and this oscillator will oscillate if the vane 16 is out from between the coils 17. Thus, with a 60 cycle input to the transformer 93, there will be a series of high frequency pulses appearing at a rate of 120 cycles per second across the base electrode tank circuit. If the oscillator should stop oscillating due to the presence of the vane between the coils 17, the 120 cycle rectified signal will produce no signal across the tank circuit in the base electrode circuit since the coils 17 will act as a short circuit therefor.

The amplifier section 91 of Fig. 6 has as an input a rectifier 94 which is connected to a parallel connected resistor 95 and condenser 96. When high frequency pulses are occurring across the tank circuit of the base electrode 31, there will be rectified pulses produced by the rectifier 94 across the resistor 95. The signal from the resistor 95 is coupled by way of a coupling condenser 97 into the main amplifier portion of the apparatus which corresponds identically to the amplifier section 61 of Fig. 5. Corresponding components in the amplifier carry corresponding reference numerals. The ony addition to the amplifier in this section is a power source 98.

The demodulated pulses appearing across the resistor 95 are amplified by the amplifier section and they will be effective to energize the relay coil 84 when the signals are rectified by the rectifier bridge 73. When the relay is energized, the blade 85 will engage contact 87. As with the apparatus of Fig. 5, the relay will be energized only when there are pulses present on the input of the amplifier which evidence proper operation of the oscillator.

Figure 7:
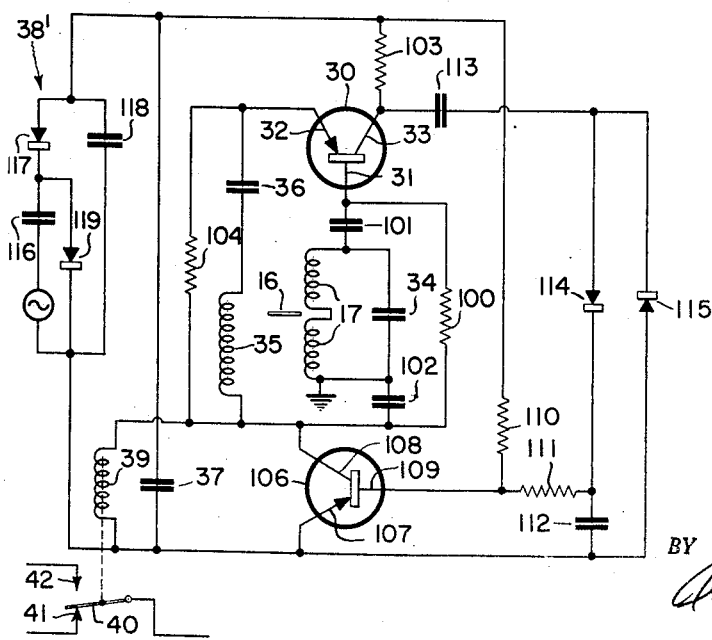
Fig. 7 shows a form of the apparatus using a transistor as a shorting impedance for a control relay.

*Figure 7*

The circuit of Fig. 7 is built up from the same basic oscillator circuit as used in Fig. 3 and corresponding components carry corresponding reference numerals. In addition, a resistor 100 is connected to the base electrode 31 and is parallel with the base electrode tank circuit, the latter having a pair of condensers 101 and 102 in series therewith to provide direct current isolation for the tank circuit so that the tank circuit coils 17 may be grounded. Connected to the collector electrode is a resistor 103. A resistor 104 is connected to the emitter electrode 32 and in parallel with the series resonant circuit formed by the coil 35 and condenser 36. Connected in parallel with the relay coil 39 is a further transistor 106, preferably of the junction type, having an emitter electrode 107, collector electrode 108, and a base electrode 109. Connected to the base electrode 109 is a first resistor 110 and a further resistor 111. Connected to the opposite end of the resistor 111 is a condenser 112. Connected to the output of the transistor 30 is a blocking condenser 113 and a pair of rectifier devices 114 and 115.

The source of power 38' is shown here as a constant direct current source. This is formed by connecting the rectifiers 117 and 119 to an alternating current source through a condenser 116. A filter condenser 118 is connected across the output.

In considering the operation of Fig. 7, it should first be noted that the oscillator section operates substantially the same as that of Fig. 3. In this figure, however, the direct current circuit for the oscillator section may flow through one or the other of two paths. The first path may be traced through the relay coil 39 starting from the positive terminal of the source 38' through the coil 39, resistor 100, base electrode 31, collector electrode 33, resistor 103, back to the negative terminal of the source 38'. An alternate circuit may be traced from the lower terminal of source 38' through emitter electrode 107 of transistor 106, collector electrode 108, resistor 100, base electrode 31, collector electrode 33, and resistor 103 back to the negative terminal of source 38'. When the oscillator section is not oscillating, the transistor 106 will have a negative potential applied to the base electrode 109 by way of the resistor 110 and this negative potential will cause a large amount of current to flow between the emitter electrode 107 and the collector electrode 108 so as to shunt the current flow which would normally pass through the coil 39. In this instance, the relay coil will remain deenergized and thus switch blade 40 will engage contact 41.

If the oscillator goes into oscillation, the oscillations will pass through condenser 113, rectifier 114, condenser 112, and condenser 37 back to the upper terminal of resistor 103 with the condenser 112 being charged to be positive on the upper terminal. This positive charge is fed through the resistor 111 to the base electrode 109 and causes the base electrode to become more positive. As the base electrode 109 is biased in a more positive direction, the current flow through the transistor between the emitter electrode 107 and the collector electrode 108 will decrease and the current flow will then pass through the coil 39 and the switch blade 40 will then be moved into engagement with contact 42.

Should the oscillations stop due to the movement of the vane 16 between the coils 17, the high frequency signal passed through the condenser 113 to be rectified will no longer be present and the condenser 112 will lose its charge. When the condenser 112 loses its charge, the biasing potential by way of the resistor 110 will become effective on the base electrode 109 to cause the transistor 106 to have a high conductance in the emitter 107—collector 108 path to short out the relay coil 39.

As with the preceding figures, any failure of the circuit which causes a loss of the oscillating signal will result in the relay becoming deenergized and thus this circuit will also fail in a safe direction.

Figure 8:
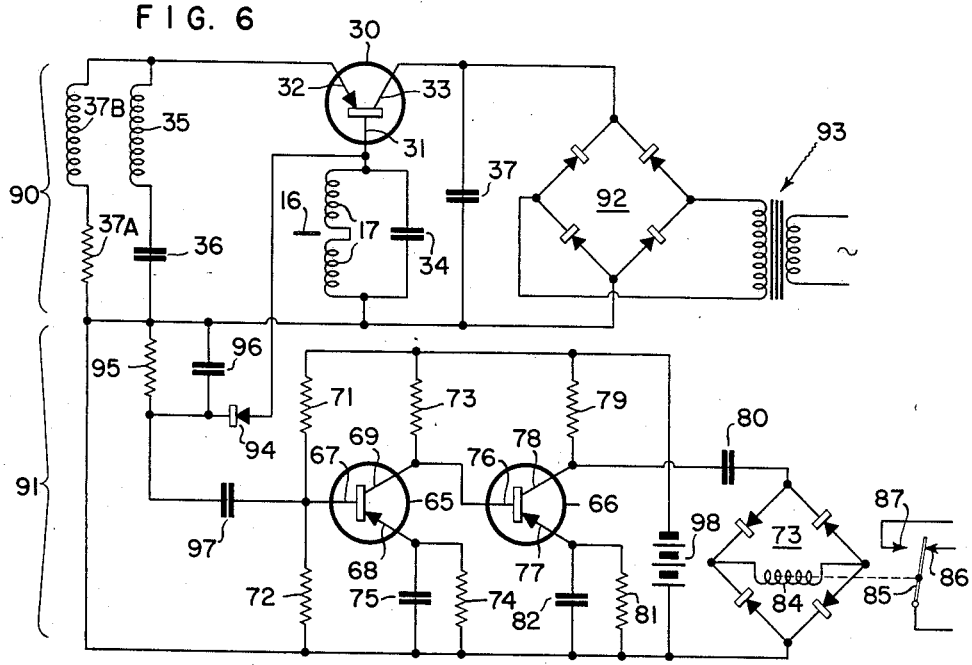
Fig. 8 shows a modified form of the apparatus of Fig. 7 incorporating voltage stabilizing circuitry.

*Figure 8*

The circuit of Fig. 8 is basically the same as that of Fig. 7 except that in this figure the circuit has been provided with additional voltage stabilizing means. Corresponding components between Figs. 7 and 8 carry corresponding reference characters. Added to the present figure is a resistor 120 which is connected to the negative terminal of the source 38' and to the lower end of the base electrode tank circuit. Also connected to the lower end of the base tank circuit is a resistor 121 with a condenser 122 connected in parallel therewith.

In all other respects, the circuit of Fig. 8 is substantially the same as that of Fig. 7.

The addition of the resistor 120 and resistor 121 is to reduce the effects due to temperature in causing changes in $I_{co}$. This voltage divider circuit formed by the resistors 120 and 121 tends to maintain the base electrode 31 at a relatively constant direct current potential even though it may be swinging due to the oscillations of the oscillator.

The overall operation of Fig. 8 corresponds to that of Fig. 7 and the oscillator portion of the apparatus will regulate the conductivity of the transistor 106 which is shunting the coil 39 so that when the oscillator is oscillating the base electrode 109 will be biased to render the impedance of the transistor high and when there is no oscillation the bias from the resistor 110 will maintain the impedance of the transistor 106 low to short out the relay coil 39.

Figure 9:
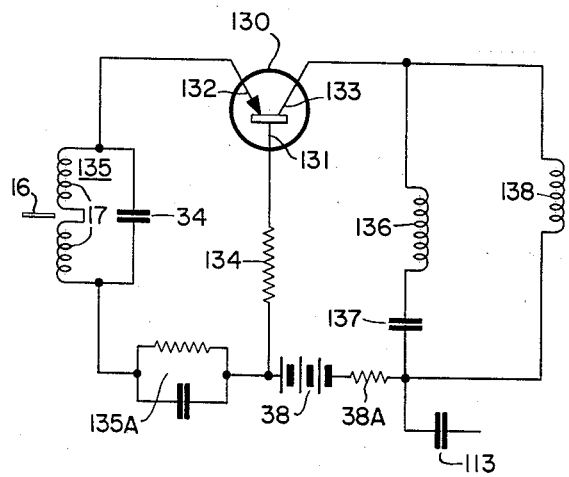
Fig. 9 shows another form of vane controlled circuit.

*Figure 9*

The circuit of Fig. 9 shows another form of vane controlled oscillator circuit which may be utilized in the previous circuits disclosed. In this circuit, there is a transistor 130 having a base electrode 131, emitter electrode 132, and collector electrode 133. A resistor 134 is connected in the base circuit while a resonant tank circuit 135 is connected to the emitter. The inductance of coils 17 of this circuit is variable as previously described. In series with the resonant circuit 135 is a parallel R-C network 135A. Connected between the collector electrode 133 and base resistor 134 is a series resonant circuit, formed by a coil 136 and condenser 137, and the power supply 38 with a load resistor 38A in series therewith. A choke coil 138 is connected to the collector 133 and to resistor 38A.

The operation of Fig. 9 is basically the same as that of Figs. 3 and 4. When the vane 16 is not between the coils 17, the resonant circuit 135 is tuned to a frequency lower than the resonant frequency of 136—137. Under these conditions, the impedance presented by the circuit 135 will be low and the circuit will oscillate. When the vane 16 moves between the coils, the resonant frequency of the circuit 135 will be the same as that of circuit 136—137. Now, the impedance of 135 will be high and the circuit alpha will be less than that necessary to sustain oscillations.

In the present circuit, the output may be taken by way of the condenser 113 and used in the output circuit of Fig. 8 to control a relay. Thus, when the circuit is oscillating an output control signal will pass through condenser 113.

Figure 10:
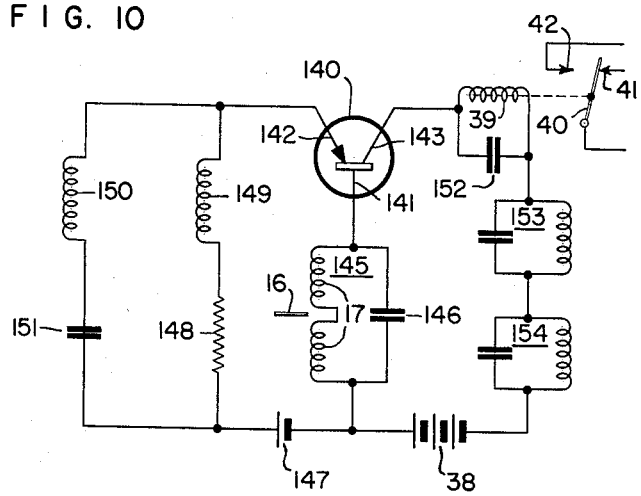
Fig. 10 shows a further form of vane controlled circuit.

*Figure 10*

The circuit of Fig. 10 represents a further modified form of vane controlled oscillator incorporating the principle of the previously discussed oscillations. In this oscillator, there is a transistor 140 having a base electrode 141, emitter electrode 142, and collector electrode 143. Connected in the base circuit is a resonant tank circuit 145 formed by the coils 17 and condenser 146. A fixed bias is applied to the emitter electrode 142 by a battery 147 through a resistor 148 and choke coil 149. A series resonant circuit is formed by a coil 150 and condenser 151.

Connected to the collector electrode circuit are the relay coil 39, having an R.F. by-pass condenser 152 connected in parallel therewith, a pair of parallel resonant circuits 153 and 154, and a battery 38. The parallel resonant circuit 153 is tuned so that it has a resonant frequency of $(1+k)f$ when $f$ is the normal oscillating frequency of the oscillator and $k$ is a constant. This circuit 153 has an inductive reactance at the resonant frequency $f$. The resonant circuit 154 is tuned to be resonant at a resonant frequency of $(1-k)f$. This circuit 154 has a capacitive reactance at the resonant frequency $f$ of the oscillator. With the two circuits 153 and 154 in series, at the resonant frequency $f$, their net impedances will be low.

At the frequency oscillation which will occur when the vane 16 is out both 150—151 and 153 and 154 will have low impedances. As vane is inserted and frequency increases impedance of both 151 and 150 and 153 and 154 will increase and the circuit will be thrown out of oscillation as described in the discussion of Fig. 3. However, the additon of the circuits 153 and 154 will cause the rate of change with frequency of the impedances tending to throw the circuit out of oscillation to be much greater than in the circuit of Fig. 3. Therefore, the sensitivity and stability of the circuit is considerably improved.

*Conclusion*

From the foregoing it will be readily apparent that an improved vane controller circuit has been provided which is simple, accurate, and adapted in many of its forms to fail safe in the event that there is a failure in the operating circuits. While the circuit tuning has been shown in certain of the selected tuned circuits, it will be readily apparent that tuning may also be accomplished in others of the resonant circuits associated with the oscillator.

While, in accordance with the provisions of the statutes, there has been illustrated and described the best forms of the embodiments of the invention known, it will be apparent to those skilled in the art that changes may be made in the form of the invention as set forth in the appended claims and that in certain cases, certain features of the invention may be used to advantage without a corresponding use of other features.

Having now described my invention, what I claim as new and desire to secure by Letters Patent is:

1. An electrical controller comprising, an oscillator including a transistor with a first resonant circuit connected to a base electrode of said transistor and a second resonant circuit connected between said first resonant circuit and an emitter electrode of said transistor, a movable vane for tuning one of said resonant circuits in accordance with the magnitude of a variable, said vane causing said oscillator to go into or out of oscillation in accordance with its position relative to said one resonant circuit, a direct current power supply for said oscillator connected to render said oscillator to be effective to oscillate if said vane is in a predetermined position, means connected to said power supply for rendering said power supply periodically effective to energize said oscillator, and relay means connected to said oscillator to respond to the periodic operations thereof.

2. In an electrical controller, the combination comprising, a transistor oscillator having an oscillation controlling impedance circuit, a vane movable in accordance with the magnitude of a variable and with respect to said impedance circuit to cause said oscillator to go into and out of oscillation, a condenser connected to said oscillator, said condenser being periodically charged and discharged by the oscillator when said oscillator is in an oscillating state, amplifying means connected to be responsive to the charge and discharge of said condenser, and a relay connected to be controlled by said amplifying means.

References Cited in the file of this patent

UNITED STATES PATENTS

| | | |
|---|---|---|
| 2,411,247 | Cohen | Nov. 19, 1946 |
| 2,505,577 | Rich | Apr. 25, 1950 |
| 2,570,436 | Eberhard | Oct. 9, 1951 |
| 2,647,252 | Moore | July 28, 1953 |
| 2,666,139 | Endres | Jan. 12, 1954 |
| 2,675,474 | Eberhard | Apr. 13, 1954 |
| 2,706,250 | Donath | Apr. 12, 1955 |

FOREIGN PATENTS

| | | |
|---|---|---|
| 513,549 | Belgium | Sept. 15, 1952 |